United States Patent
Voges

[19]

[11] Patent Number: 5,967,725
[45] Date of Patent: Oct. 19, 1999

[54] SELF-ATTACHING PLUG-IN AND SCREW-ON FASTENING ELEMENT

[76] Inventor: Karsten Voges, Ingolstädter Strasse 26, D-60316 Frankfurt am Main, Germany

[21] Appl. No.: 09/151,301

[22] Filed: Sep. 11, 1998

[30]  Foreign Application Priority Data

Sep. 13, 1997 [DE] Germany .............................. 197 40 320
Jul. 25, 1998 [DE] Germany .............................. 198 33 606
Aug. 26, 1998 [EP] European Pat. Off. .............. 98116063

[51] Int. Cl.$^6$ .............................. F16B 25/00; F16B 39/34
[52] U.S. Cl. ........................ 411/386; 411/302; 411/508; 411/970
[58] Field of Search ..................................... 411/299, 300, 411/303, 304, 386, 340, 344, 345, 970, 302, 508, 509

[56]  References Cited

U.S. PATENT DOCUMENTS

| | | | |
|---|---|---|---|
| 2,727,551 | 12/1955 | Rees | 411/303 |
| 3,175,452 | 3/1965 | Leitner | 411/340 |
| 3,439,575 | 4/1969 | Gifford | 411/386 |
| 3,473,431 | 10/1969 | King, Jr. | 411/344 X |
| 4,432,683 | 2/1984 | Polos | 411/340 |
| 4,907,924 | 3/1990 | Hellon | 411/303 |

FOREIGN PATENT DOCUMENTS

| | | |
|---|---|---|
| 0 056 625 | 7/1982 | European Pat. Off. . |
| 18 78 229 | 6/1963 | Germany . |
| 1 890 031 | 3/1964 | Germany . |
| 1 982 736 | 12/1967 | Germany . |
| 1 997 148 | 11/1968 | Germany . |
| 1 077 221 | 3/1977 | Germany . |
| 36 00 384 A1 | 7/1986 | Germany . |

OTHER PUBLICATIONS

Dr.–Ing. Peter Funk, *Mauerwerk–Kalender 1993*

*Primary Examiner*—Neill Wilson
*Attorney, Agent, or Firm*—Larson & Taylor

[57]  ABSTRACT

The fastening element has a threaded part (3) and in front of it a carrier part (4) with an elastic element (5). The carrier part (4) may be a different material, such as an elastic plastic, from that of the threaded part (3) and may be joined either firmly or releasably to it, the latter for instance by a screw or detent connection. The elastic element (5) can be attached in front of the threaded part (3) with the contrary thread (6) or at some other point in frictional or detent engagement, in that at the beginning of an assembly operation, the two parts (1, 6) to be screwed together are simply inserted axially into one another. The radially outer ends of the spring tongues (5) forming the elastic element can be located on a helical line in an extension of the thread course of the threaded part (3).

18 Claims, 7 Drawing Sheets

SELF-ATTACHING PLUG-IN AND SCREW-ON FASTENING ELEMENT

FIELD OF THE INVENTION

The invention relates to a fastening element, having a threaded part with a front axial end and a rear axial end, and having at least one portion forming a carrier part, on which portion at least one elastic element extending radially at least into the radial region of the thread is mounted.

BACKGROUND OF THE INVENTION

Such fastening elements are known from German Utility Models 1 997 148 and 76 36 365. These are so-called captive screws, which are to be inserted through a hole in a component and secured against falling out of the hole and being lost if the associated nut is lost. The elastic element is disposed behind the rear end of the threaded part and thus cooperates not with the associated nut but rather with the hole in the component.

The invention, by comparison, has to do with the assembly operation in making a screw connection. This term is understood very generally to mean screw connections, threaded pin connections, screw bolt connections, and the like. It also encompasses combinations and mixed forms of these fastening elements. A wide range of such threaded fastening elements are known from the prior art and are used to fasten or join parts to other parts, such as to join connectors, flanges or the like.

In the sense of the present invention, the threaded part is an axial portion of the fastening element having at least one male or female thread. The thread is a helical profiling of the circumferential surface of a pinlike or boltlike element or in a bore or opening, such as in a nut. The threads may for instance be trapezoidal, sawtooth, round or pointed threads or may have some arbitrary other profile cross section, and are used for fastening purposes and to transmit force and/or motion.

One problem in making threaded connections is that the pinlike fastening element, such as a screw, can slip out of the opening, such as the threaded bore, unless the first thread courses have entered into engagement. This is especially problematic if to make a connection, fastening or the like both hands are needed to hold parts, if tools are used, or if the assembly is done at places hard to access, with especially small fastening elements, or against gravity.

OBJECT AND SUMMARY OF THE INVENTION

The object of the invention is therefore to simplify the making of threaded or screw connections.

This object is attained by a fastening element having a threaded part and a carrier part of an elastic element, in which the elastic element is disposed forward of the front end of the threaded part.

The invention offers the advantage that the final assembly system, for instance comprising a screw and a nut or a threaded bolt and a threaded bore, is supplemented with a preassembly system formed by a carrier part and an elastic element. Because of the combination of the two systems, it is possible at the outset of an assembly operation first only to bring the elastic element into engagement with the counterpart thread or the part carrying the counterpart thread by means of a simple insertion operation, or in other words without any rotary motion or the necessity of maintaining a precisely aligned position. The elasticity of the elastic element allows initial deviations from the previously required, precisely centered, aligned relative position with which the two cooperating threaded parts had to be brought into engagement. Next, the elastic element, brought solely by axial pressure into engagement with the counterpart thread or some other region of a part to be joined to the fastening element, provides for a temporary connection between the parts to be fastened, for instance by means of friction with the counterpart thread and/or by snapping into the thread courses of the counterpart thread or some special engagement region. It offers the assembler the opportunity of changing hand positions and assembling the preassembled parts in final form now, by hand or with a tool, by screwing the threaded parts into one another. The elastic element and the carrier part can act as a centering aid in the process, by being embodied appropriately. Furthermore, the elastic element can be disposed and embodied in such a way with regard to the front end of the threaded part that in the preassembled position it exerts an axial tension on the joined-together parts that holds them in a certain axial relative position, in which the threads come into contact axially, for instance.

It is understood that the fastening element, which in the outset state is joined to the elastic element via the carrier part, may be either the pin-or boltlike element with a male thread or the nut, or some other part with a bore with a female thread. The distinction is that an elastic element mounted forward of the front end of a male thread is larger in cross section than the inside cross section of the opening to be brought into engagement, and/or becomes radially compressed at the outset of the jointing process, while whenever the elastic element is mounted forward of the front end of a female thread, the cross section of the elastic element is smaller than the outer diameter of the bolt portion to be brought into engagement and/or radial flaring is done at the beginning of the jointing operation. The maximum outer diameter or minimal inner diameter of the elastic element is located forward of the front end of the threaded portion on which the elastic element is disposed.

Depending on the assembling situation, the elastic element can also be used in cooperation with other than threaded surfaces to secure a preassembled state. For instance, a threaded bolt or screw with an elastic element on the front end can be inserted through smooth cylindrical holes in one or more components and be held thanks to the elastic element, until the worker picks up a nut and screws it on.

The carrier part—a portion which carries the elastic element—can have multiple advantages, for instance, it is suited to bringing the elastic element into a favorable position for the preassembly—for instance to create a favorable spacing between the elastic element and the front end of the threaded part—and a favorable orientation. Moreover, it can assist in the precentering of the counterpart thread in the preassembly. The carrier part may—but need not necessarily—be located forward of the front end of the threaded portion, and can be reduced in size, in an individual case to a very small portion at the transition to the resiliently acting elastic element.

The fastening element, carrier part and elastic element can in principle be made in one piece or in various pieces and may be made from different materials.

The production of screws, nuts and other fastening elements with a thread and a carrier part disposed in front of it with an elastic element in a one-piece embodiment presents no difficulties, for instance if they are produced by injection molding of an adequately elastic plastic. However, most fastening elements with a thread used in industry and in installation work are of metal, especially steel and brass. The large-scale mass production of screws and nuts of these materials can become extraordinarily complicated if one were to make them in one piece with an elastic element. If the fastening element and the elastic element are made in different pieces, it becomes necessary to join them together. It is desirable that this connection, which may possibly be disconnectable again, be realized simply and economically in terms of production.

A further problem is the separability of preassembled or finally assembled screw connections, if the elastic element in the preassembled state is meant to hold onto the opposite component or fastening element brought into engagement with it not merely by frictional engagement but also reliably in a form-fitting detent fashion, for instance. In that case, the parts can often not be separated again without destroying them.

To solve these problems, as well, the invention also proposes that the threaded part on the one hand and a carrier part with an elastic element on the other be at least two separate parts that can be joined together. This preferred embodiment has various advantages. With a suitable embodiment of the carrier part, it offers the option of making the connection with the fastening element simply and economically. It also allows the nondestructive separation of the carrier part along with the elastic element from the threaded part if needed, for instance whenever the preassembled state is to be reversed or the threaded connection is to be disconnected again. It also offers the opportunity of using different materials, each optimally suited, for the threaded part and the elastic element. Thus a threaded bolt or a steel screw, for instance, with high load-bearing capacity and great hardness can be combined with a carrier part and elastic element of plastic with the best possible spring properties. Furthermore, the production costs can be reduced, since the bolts, screws, nuts and other parts with threaded bores can be made by conventional, proven large-scale production technology, while the carrier parts with the elastic elements can be made as injection molded parts, for instance. Joining the two types of parts can be done in an automated jointing operation, or can be left to the user, who even has the opportunity, with standardized seat faces, fitting one another, on the threaded part and the carrier part respectively, of combining a certain threaded part with different elastic elements, depending on the assembly situation.

Because of the numerous advantages named above, it is assumed that the two- or more-part embodiment, in which the elastic element is joined to the fastening element by means of a carrier part, will become standard for normal use. Even with fastening elements of plastic, it can be recommended that materials adapted to the applicable function be used for the threaded part and the carrier part with the elastic element, that is, that two parts be made that are joined together subsequently.

For joining the threaded part and carrier part, in principle all known jointing processes are suitable, such as welding, soldering, adhesive bonding, pressing, pinching, shrinking, detent locking, or screwing. In another advantageous proposal of the invention, the region of the carrier part used for the joining with a pinlike fastening element, may be embodied as a hollow space and contain a female thread, detent means, or the like, for instance, the corresponding receiving region of the pinlike fastening element is then embodied complementary to this hollow space—for instance being bolt like or in the form of a tanglike protrusion—and can have corresponding detent means, male threads or the like. This kind of receiving region, embodied for instance in boltlike fashion or as a tanglike protrusion, can highly advantageously be produced, including the male thread, groove or the like on it, by cold rolling of steel or from some other deformable material. This means that in the production of a pinlike fastening element, no additional steps are required to produce the receiving region for the carrier part, since a mere modification of the female dies used can be sufficient. Carrier parts embodied in this way, or receiving regions for the carrier part located on the fastening element embodied in this way, can be joined together in a simple way by screwing, detent locking, adhesive bonding, or the like. In screw or detent connections, the connections can be made disconnectable again—for instance to make it possible to undo the preassembly. If the disconnectability should be made more difficult or should be avoided, then conventional securing means for a screw connection can be used, such as suitable shims, adhesives, or the like. In principle, however, it is also conversely possible to embody the receiving region of the fastening element for the carrier part as a hollow space.

Preferably, but not necessarily, a thread used for the connection with the carrier part has the same pitch direction as the main thread of the fastening element.

In screws, depending on the diameter, in most cases a caplike carrier part, whose outer diameter is somewhat less than the inside cross section of the counterpart thread, will be secured to a tanglike protrusion on the front end of the screw. In the case of a screw connection, in this case the tanglike protrusion is provided with a male thread, while the caplike carrier part is provided with a female thread. If the diameter is sufficiently large, however, the carrier part can also be secured, instead of to the circumferential surface of a tanglike protrusion, on the front end face, for instance by adhesive bonding, or can be snapped into a bore in the front end face. The form of the carrier part depends on the mode of fastening, and optionally its further function as a centering aid should be taken into consideration.

In the case of a nut or some other component with a threaded bore that is made in two parts, the carrier part will normally take the form of a ring, which is secured disconnectably or nondisconnectably in a terminal bore portion, for instance by screwing, detent locking, adhesive bonding, or the like. Once again, however, in an individual case it is possible to mount the carrier part on the face end.

Along with the fundamental concept of combining a threaded part for final assembly with an elastic element for preassembly and the further proposal, which is important for production and application, of fastening the elastic element to the fastening element by means of the suitably embodied carrier part, the configuration of the invention includes, as a third inventive characteristic, embodying at least one part of the elastic element as either a thread or a thread fragment. One can imagine such a thread fragment conceptually by removing parts of a thread. This allows screwing to a counterpart thread, and can be embodied such that no unnecessary play occurs in the process of being screwed to the counterpart thread. A thread fragment can be achieved in a simple way, for instance by giving the elastic element the form of a plurality of spring tongues distributed over the circumference, with their radially outer or inner ends axially offset in such a way that they are located on a thread course corresponding to the thread of the threaded part. Once again, with this embodiment, a plurality of advantages are attained at once. Although in fact an elastic element formed in this way can be either screwed into a counterpart thread in the preassembly or detent-locked to it by an axial insertion motion, and can be pulled out again axially only if a certain axially oriented force is exerted, the subsequent or later undoing of the connection after the final assembly by screwing the threaded parts together presents no difficulties, because the elastic element together with the threaded part can also be unscrewed from the counterpart thread. An arrangement with such properties can be defined in general as a screwable insertion region. By suitable design of the elastic element—for instance by angling the spring tongues in the mounting direction—the attachment by insertion can be made easier and pulling them out again can be made more difficult. In addition, an elastic element embodied in this way can firmly hold the counterpart thread by friction, for instance by means of a radial spring force.

The further advantage attained by the invention is that the elastic element, otherwise used for preassembly and centering, can contribute to the load-bearing capacity of the threaded connection in the finally mounted state. This in turn offers the opportunity of replacing part of the thread courses of the main thread by the threadlike or partially threadlike elastic element, with the advantage that this possibly even larger part of the thread, at the outset of the assembly operation, need merely be thrust into or onto the counterpart thread, and after that only a few turns by hand or by means of a tool are needed in order to firmly tighten the screw connection.

Several exemplary embodiments of the invention will be described in further detail below in conjunction with the drawings.

DESCRIPTION OF THE PREFERRED EMBODIMENTS

Figure 1A:
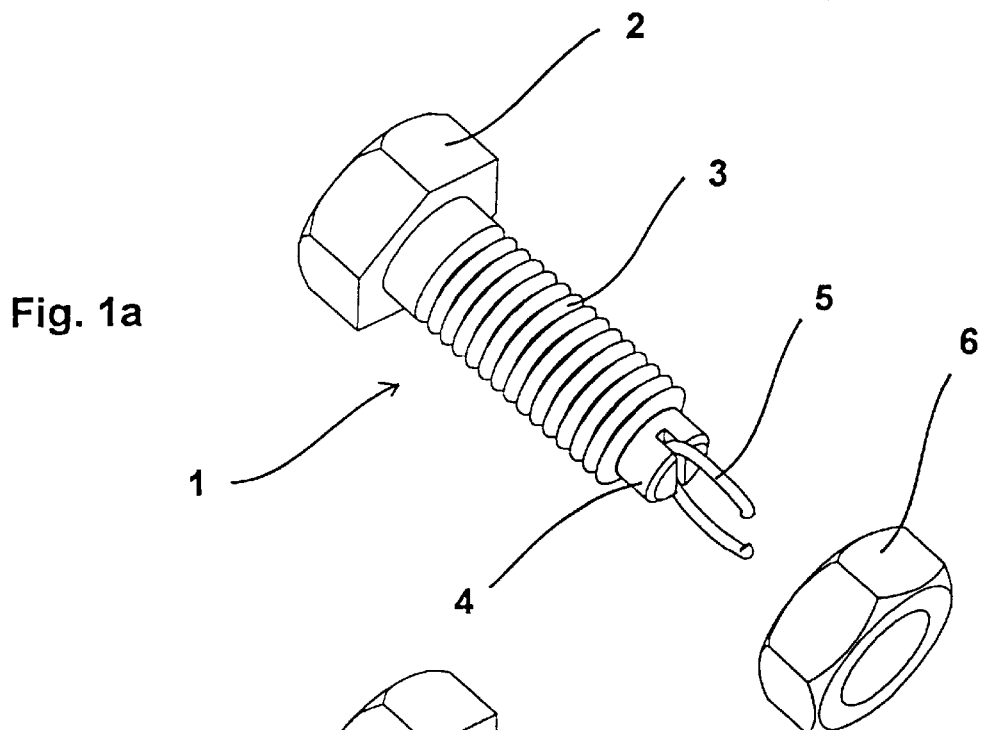
FIGS. 1a, 1b and 1c show a screw, with an elastic element mounted on it front end, in three stages of being joined to a nut.

The screw 1 schematically shown in FIG. 1a has a hexagonal head 2 and a threaded part 3. On its front end, on a carrier part 4, an elastic element 5 embodied as a bent spring wire is mounted, for instance by adhesive bonding, soldering, welding, clamping, sliding insertion from the side, mechanical locking in the axial direction, or in some other way. The spring wire 5 forms a hoop with spring tongues, which beginning at their fastening point are bent in such a way that their front, free ends can readily be introduced into the threaded bore of the associated nut 6, but in the relaxed state of the spring wire 5 forming the elastic element the radially outermost points of the spring tongues, radially curved outward between the front ends and the fastening point, are located on a radius that is greater than the radius of the inside cross section of the threaded bore of the nut 6.

Figure 1B:
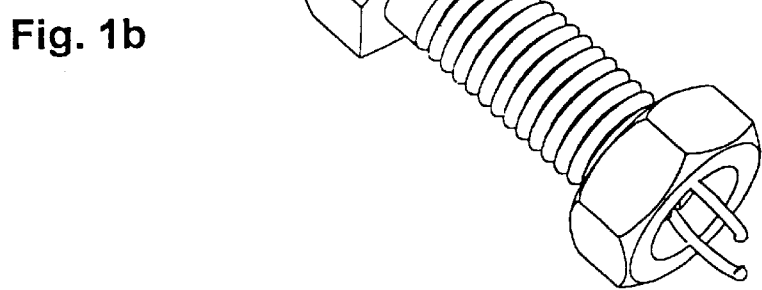
Figure 1C:
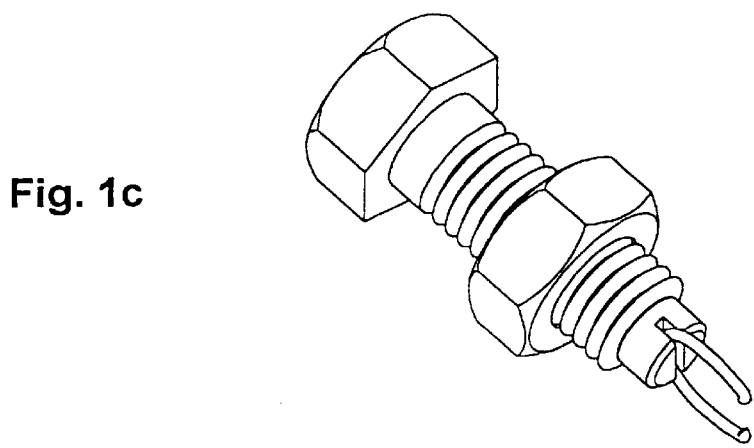

For preassembly, the spring wire 5 need merely be introduced far enough into the nut 6, being radially compressed in the process, that it holds the screw 1 relative to the nut 6 in the preassembled state. This can be achieved for instance by friction or detent locking with the thread courses of the nut 6. It is equally possible for the spring tongues, after their outermost regions have been introduced through the nut, to spread apart again and thus press the nut axially against the screw thread. The preassembled state is shown in FIG. 1b. Just as this connection has been made by simply slipping the nut onto the screw or inserting the screw into the nut, this connection can also be undone by simply pulling the parts apart, beginning at the position shown in FIG. 1b. On the other hand, it is also possible, beginning at the position in FIG. 1b, to commence with the screwing operation, as shown in FIG. 1c, in order to achieve the final state of assembly. The onset of the screwing motion is facilitated by providing that the diameter of the carrier part 4 is selected to fit the inside cross section of the threaded bore of the nut 6, thus centering the two parts.

Figure 2A:
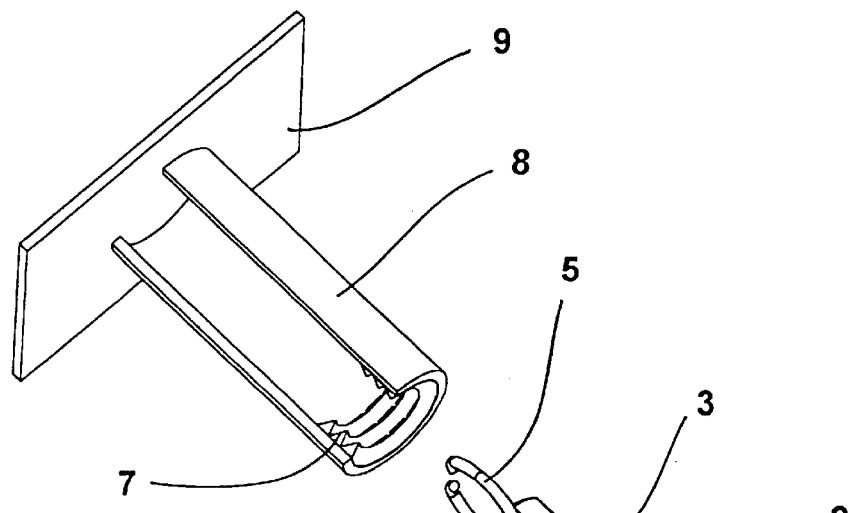
FIGS. 2a, 2b and 2c show a screw with an elastic element in three stages of being joined to a component with a threaded bore.

The exemplary embodiment of FIGS. 2a, b and c shows that the elastic element 5 is suitable for temporarily holding the parts to be joined not merely in cases such as with a nut, through which it may already protrude in the preassembled state, but also whenever the counterpart thread 7, for instance, is embodied in a longer threaded sleeve 8 on a component 9. In that case as well, the preassembly can be effected by friction or detent locking of the spring tongues in the thread of the threaded sleeve, or by spreading apart of the spring after their outermost regions have been passed through the thread. A hold can also be achieved by frictional detent locking of the spring on the circumferential wall adjacent to the thread. The embodiment of the threaded sleeve 8 as a dowel is of particular significance.

Figure 3A:
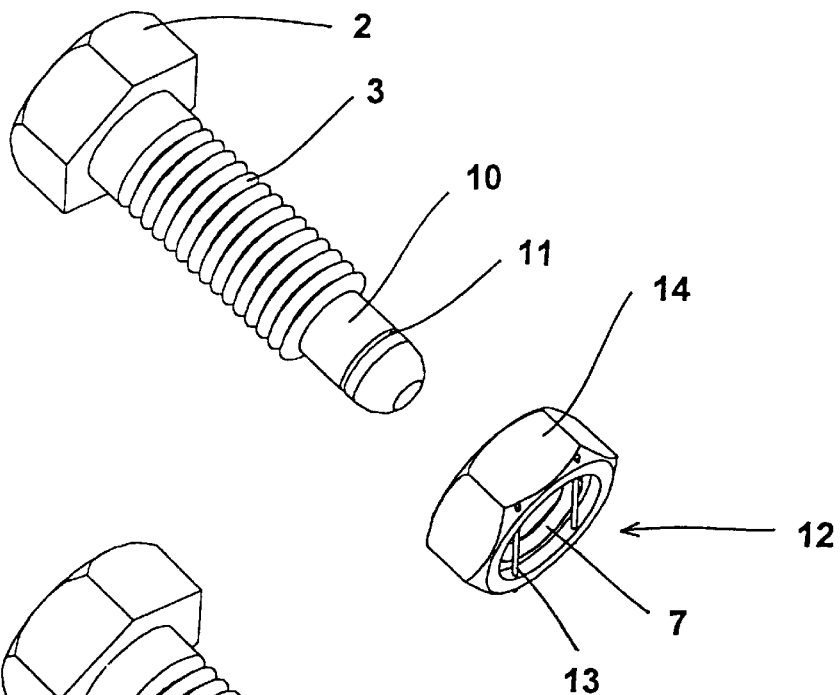
FIGS. 3a, 3b and 3c show a nut with an elastic element in three different stages of being joined to a screw.
Figure 3B:
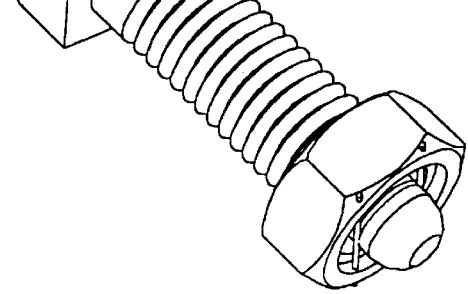
Figure 3C:
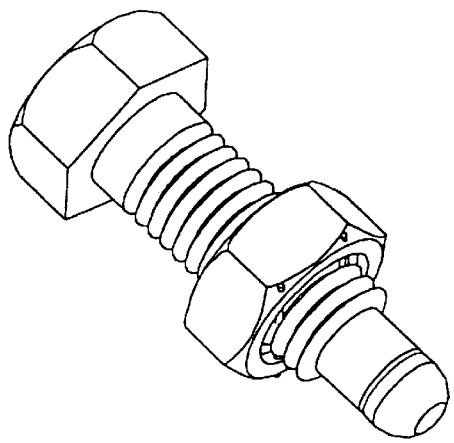
Figure 4:
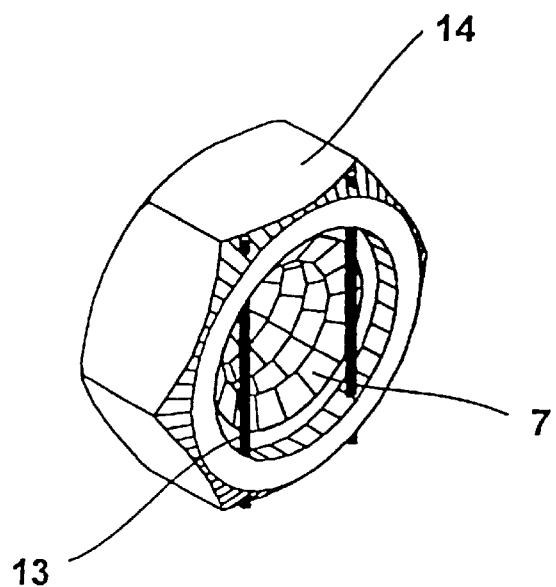
FIG. 4 shows a nut of FIGS. 3a, b, c on a larger scale and from a different perspective.

FIGS. 3a, b and c and FIG. 4 show a fastening element in the form a nut 12 with a female thread 7 and hexagonal male faces 14. On one axial end, or in this example on both axial ends, two pieces of spring wire 13 are inserted into the body of the nut, in parallel position with respect to one another, in each case in front of the threaded part 7 in a thread-free, narrow, annular carrier part, in such a way that they intersect the threaded bore in the manner of chords. The spacing between the paired parallel spring wires 13 is selected such that it is somewhat smaller than the outside diameter of the threaded part 3 of the associated screw. It may even be smaller than the core diameter of the threaded part and may cooperate with an annular groove 11 in a tanglike protrusion 10, disposed in front of the threaded part 3 of the screw, the diameter of the protrusion corresponding approximately to the core diameter of the screw. In assembly, the tanglike protrusion 10 of the screw can then be brought into engagement with the spring wires 13 mounted on the nut 12 by simply being inserted axially into the nut 12. The hold can be achieved by friction of the spring wires with the tanglike protrusion 10, or by snapping into the annular groove 11. FIG. 3b shows the parts in this preassembled position, in which they are already incapable of falling apart because they are held together by the elastic restoring force of the spring wires 13. After that, the worker can get his hands free and put the threaded part 3 of the screw into screwing engagement with the female thread 7 of the nut as shown in FIG. 3c.

If the nut 12 is provided on only one end with spring wires 13 or some other elastic element, then the desired preassembly function is also achieved if the elastic element 13 of FIG. 3a is located on the rear end of the nut 12, with respect to the screw. However, the prerequisite for this is a relatively long tanglike protrusion 10, which in the preassembled position of FIG. 3b must extend through the nut over the entire axial length. It is therefore preferable to use a nut 12, provided with an elastic element 13 on only one end, in such a way that it points toward the screw with the side on which the elastic element 13 is located. Then a substantially shorter tanglike protrusion 10 is sufficient, or such a protrusion can even be dispensed with entirely.

Figure 2B:
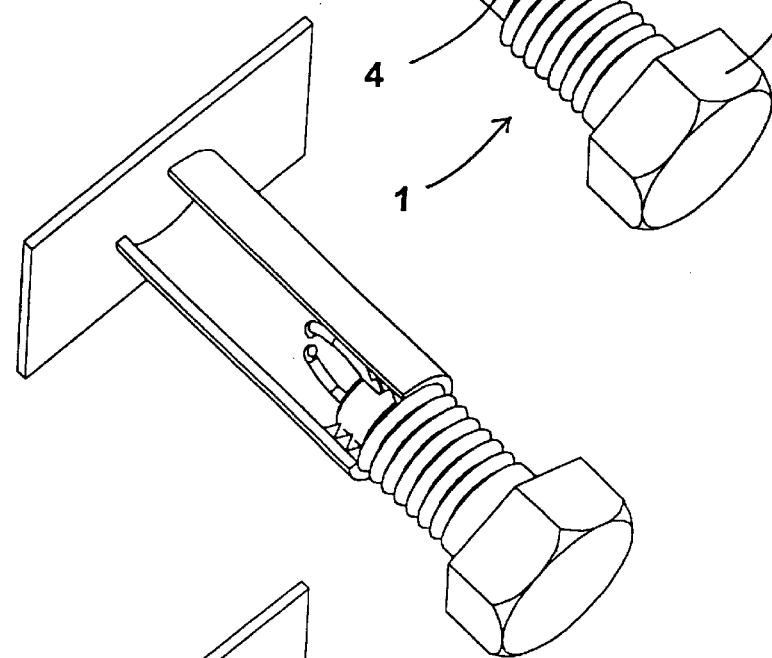
Figure 2C:
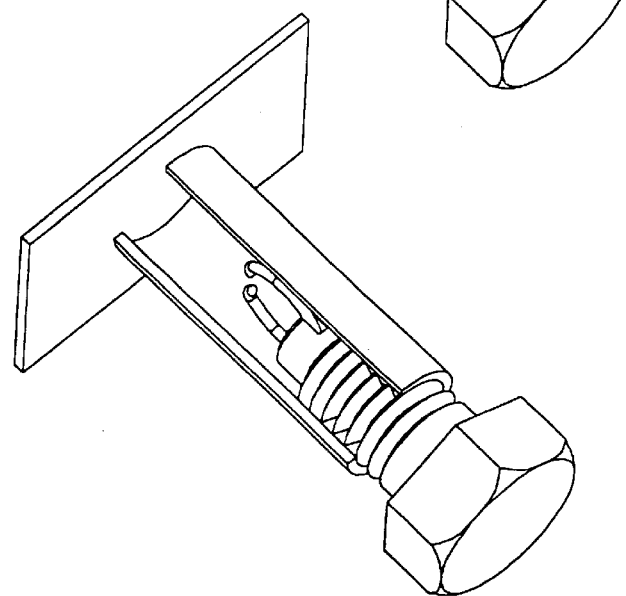
Figure 5:
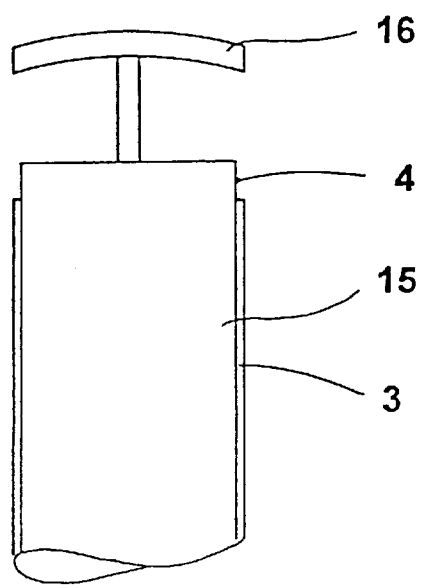
FIG. 5 shows the front end of a screw with an elastic element shaped differently from that of Figs. 1a, b, c.

In FIG. 5, an embodiment of the elastic element is shown that is modified in comparison with FIGS. 1 and 2. It comprises a shaft, which protrudes axially in a central position from the carrier part 4 disposed in front of the threaded part 3 of the threaded bolt 15, and on whose front end an elastic cross bar 16 is mounted. The crossbar can from the outset be bent or angled slightly toward the rear from the center and may also have more than only two legs or spring tongues. On being axially inserted into a threaded bore, such an elastic element can effect a detent-locked preassembled position that holds very firmly in the opposite direction. If the axial shaft is long enough, the crossbar after passing through the thread can spread apart again and can for instance block off the return route to a nut or threaded sleeve of FIGS. 2a, b and c. If the legs are angled in the assembly direction, pressure by the preassembled nut against the legs then even leads to an increase in the outer diameter of the legs; that is, the elastic element 16 acts like a barb.

Figure 6A:
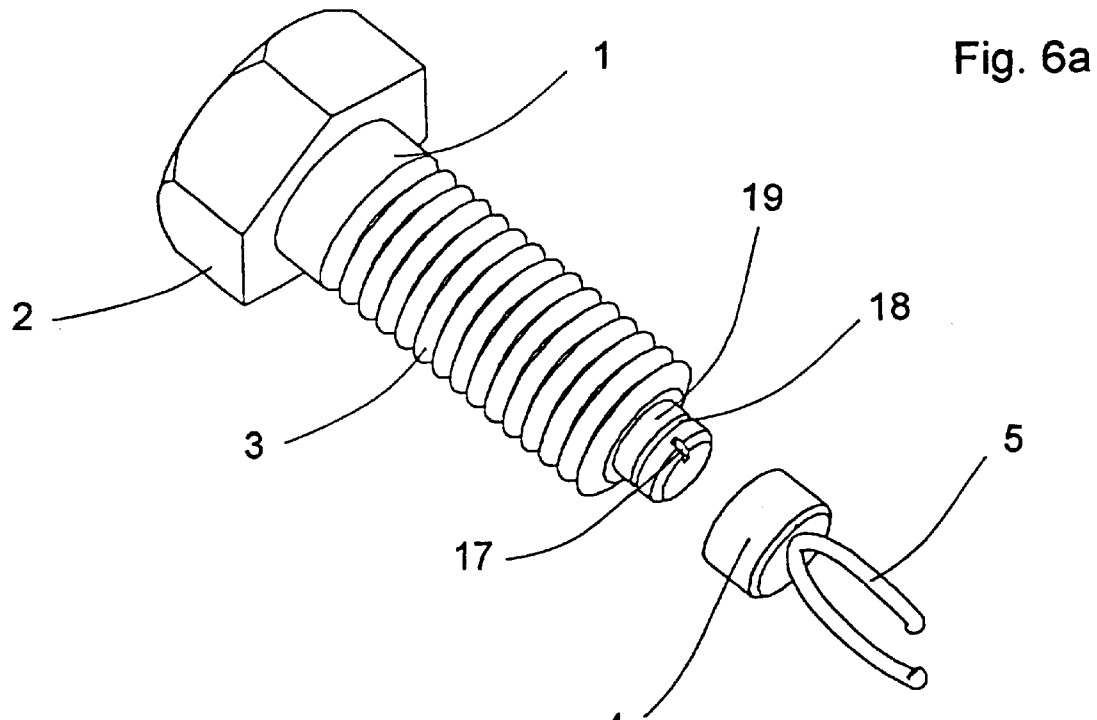
FIGS. 6a and 6b are perspective views of a screw, made in two parts, with an elastic element before and after being joined to the threaded part of the screw by detent locking.
Figure 6B:
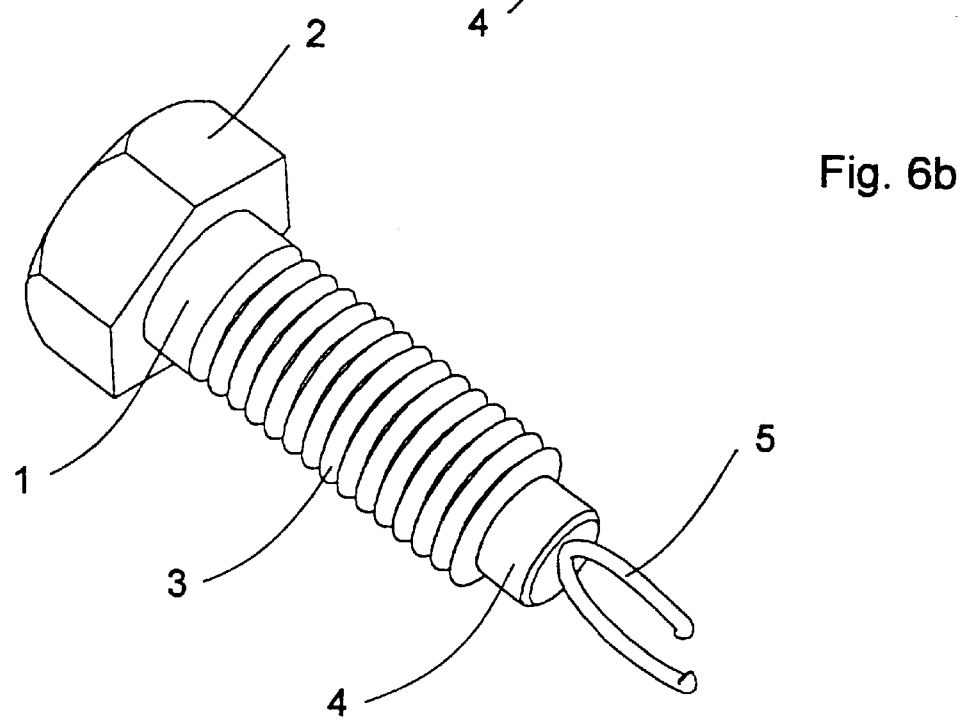

In the screws shown in FIGS. 6a and b and 7a and b, the elastic element 5 can be joined to the fastening element 1 by means of a carrier part 4. The rear part of the screws with the hexagonal head 2 and threaded part 3 is identical to FIG. 1a. However, in the version of FIGS. 6a and b, a tanglike protrusion 19 provided with an axial groove 17 and an annular groove 18 is located in front of the threaded part 3, and its diameter is so small that a caplike carrier part 4 set on it can have a diameter that is at most as large as the core diameter of the threaded part 3. In the exemplary embodiment, the carrier part 4 is made integrally with an elastic element 5 formed onto it of elastic plastic as an injection-molded part, while the screw 1 is of steel, for instance. The inner circumferential wall of the caplike carrier part 4 is formed with an annular rib, which fits the annular groove 18 and is correspondingly disposed axially, and is also formed with an inner protrusion that fits the axial groove 17. When the caplike carrier part 4 is set on the tanglike protrusion 19 of the screw 1, the annular rib, not shown, snaps into the annular groove 18, and the inner protrusion, also not shown, comes into engagement with the axial groove 17. As a result, the carrier part 4 is fixed axially firmly and nonrotatably on the front end of the screw 1. Instead of the axial groove 17, however, any other deviation from rotational symmetry on the part of the tanglike protrusion 19 can prevent rotation of the carrier part, if its hollow space is suitably adapted to the external form of the tanglike protrusion. It is understood that conversely as well, an annular groove and an axial groove could be formed in the inner circumferential wall of the caplike carrier part 4, and a corresponding annular rib and a protrusion on the tanglike front end of the screw 1 can be brought into engagement with the grooves. By varying the shape of the cap, for instance by using slits, the elasticity of the cap can be varied. By further provisions, such as the embodiment of the profile of the annular groove 18 and the annular rib that fits it, the disconnection of the carrier part 4 from the screw 1 can be selectively made more difficult or easier. Furthermore, the outer edge of the tanglike protrusion 19 and/or the rear inner edge of the carrier part 4, or its outer front edge, may be chamfered in order to facilitate joining the screw 1 to the carrier part 4 and introducing it into a threaded bore at the onset of the assembly operation.

In the case of the hooplike shape of the elastic element 5 shown in FIGS. 6i a and b, after the final assembly the screw connection can be undone again without destruction by axially pulling or compressing the spring tongues. If a detent-locking or barblike elastic element 5 is used, such as in FIG. 5 or FIGS. 7a and b, it will normally be recommended that the elasticity of the caplike carrier part 4, as well as the depth and shape of the annular groove 18 and the corresponding annular rib, be selected such that the carrier part 4, to undo the screw connection, can be pulled off nondestructively from the front end of the screw 1.

Figure 7A:
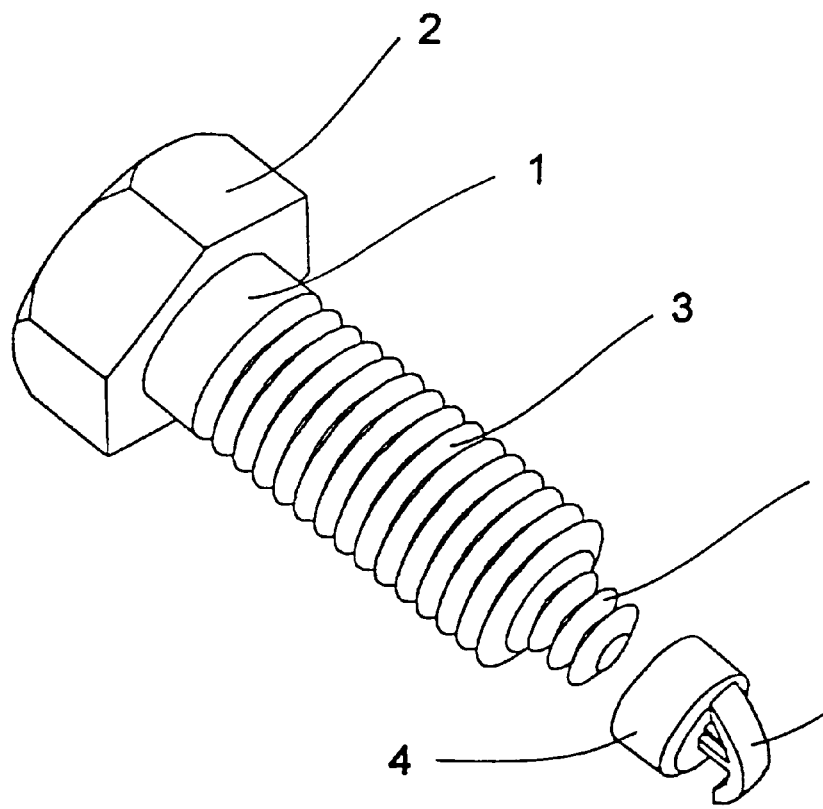
FIGS. 7a and 7b are views similar to FIGS. 6a and b of a two-part screw with an elastic element to be joined by screwing.
Figure 7B:
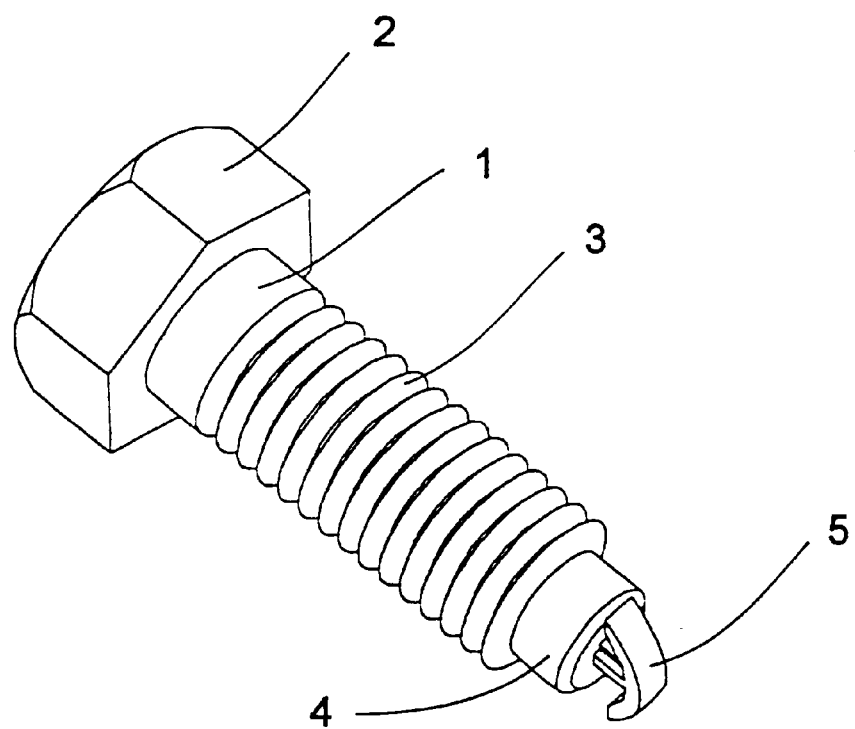

The exemplary embodiment of FIGS. 7a and b differs from the embodiment of FIGS. 6a and b in that the elastic element 5 has the detent-locked form also shown in FIG. 5, and that the recessed, tapered frontmost end of the screw 1, which corresponds to the cylindrical tanglike protrusion 19, is provided with a male thread 20 which cooperates with a corresponding female thread in the caplike carrier part 4. The two parts can be joined together by screwing, and this connection can be undone again as needed, for instance if the threaded connection is later dismantled. If desired, however, the detachment of the carrier part 4 can also be prevented by means of a transverse pin, appropriate shims, adhesive, or some other screw securing means.

It is understood that the elastic element 5 may take many various forms, and for instance may have more than two spring tongues or resilient hoops. It may also be integral with the carrier part 4 and comprise suitably bent spring wire, which for instance in the region of the carrier part 4 is wound like a helical spring and is intended likewise to be placed with this part on a tang 19 or male thread 20. Furthermore, the elastic element 5 and its carrier part 4 may be made of or comprise rubber, silicone or foam rubber, for instance.

Figure 8:
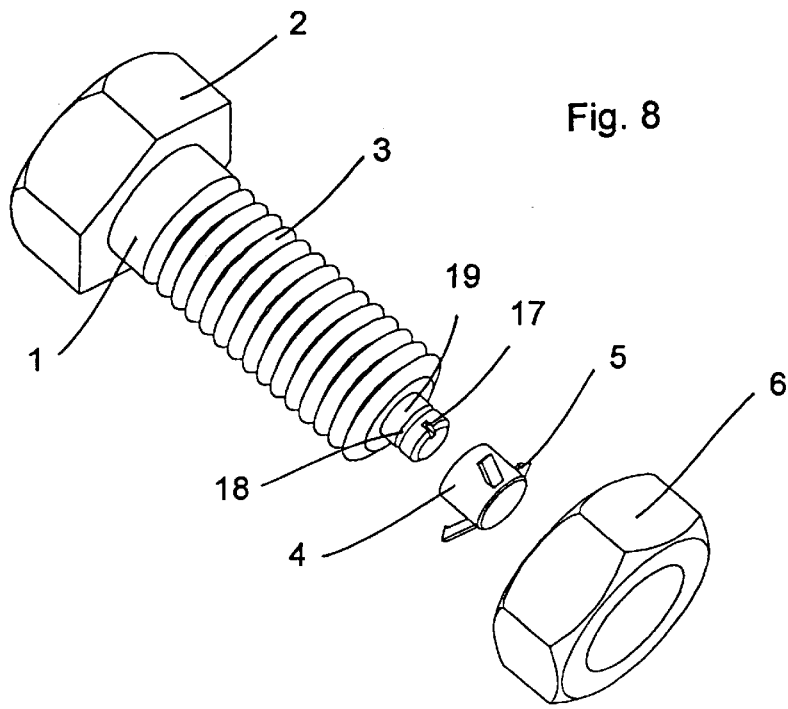
FIG. 8 is a perspective view of a nut with an associated screw onto whose front end a carrier part with an elastic element in the form of a plurality of spring tongues is to be attached, the radially outer ends of the spring tongues being located on the helical line of the thread course of the screw.

The exemplary embodiment shown in FIG. 8 has a screw 1, which may be made integrally or, as shown, with a separately made carrier part 4 with an elastic element 5. The special feature compared with the variant embodiments described above is that the radially outer ends of the spring tongues 5, which are distributed over the circumference and are oriented obliquely rearward, are axially offset in such a way that in the preassembled state they are located on a helical line that forms a continuation of the thread course of the threaded part 3. The outer regions of the spring tongues 5 act as a thread fragment, whose parts are resilient radially and axially from front to back in such a way that they selectively allow axially sliding into the female thread of the associated nut 6 or other counterpart thread, or screwing insertion into such a female thread. They can also be unscrewed from this thread again. The number of thread fragment courses can be varied depending on the embodiment. If there are a plurality of thread fragment courses, the spring tongues of adjacent thread fragment courses can be staggered, so that each tongue faces a gap and upon elastic deformation can escape into the gap. Chamfering or slanting the spring tongues in the assembly direction makes it easier to slip a counterpart thread onto them, while an axial motion in the opposite direction is made more difficult. If the outer diameter of the thread fragment is reduced compared with the diameter of the threaded part 3, this can make it easier to slip on a counterpart thread, because the elastic deformation of the thread fragment required for this can be less. For instance, by increasing the outer diameter of the spring tongues to more than the diameter of the threaded part 3, it can be made more difficult to screw the female thread along the spring tongues by friction. This can prevent unintended disconnection of the preassembly by screwing.

Figure 9:
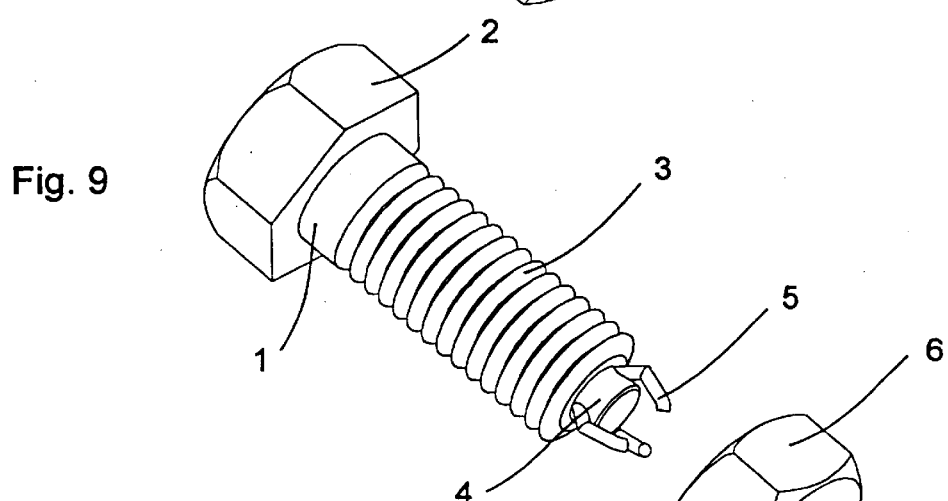
FIG. 9 is a view corresponding to FIG. 8 of a modified embodiment, with spring tongues shaped differently.

A comparison of FIG. 9 with FIG. 8 shows that the spring tongues 5 can also have a form that approaches that of the hoops in the version of FIGS. 6a and b. In that case, instead of radially outward-curved rounded bends, they have radially outward-pointing kinks or some other thread fragment, and the radially outermost points of the kinks of spring tongues 5 are located on a helical line, so that once again they can selectively be either axially thrust into the female thread of the nut or inserted into it by screwing.

Figure 10:
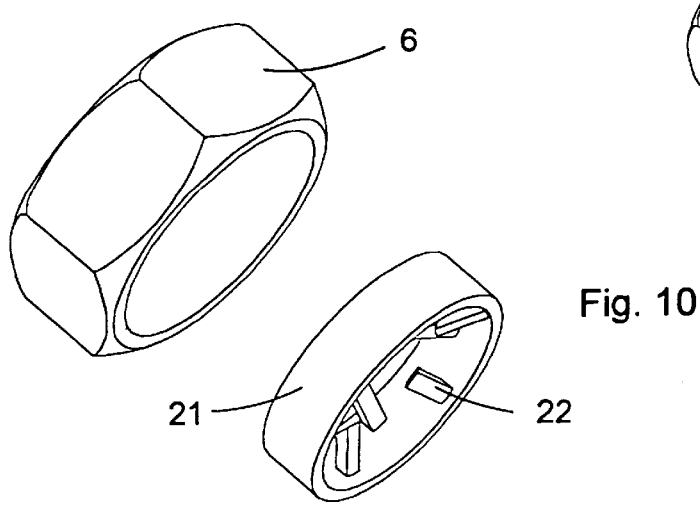
FIG. 10 is a perspective view of a nut with a cylindrical terminal bore portion, into which a schematically shown annular carrier part with radially inward-protruding spring tongues can be inserted, the free ends of the spring tongues being located on the helical line of the nut thread.

FIG. 10 illustrates the use of the concept, expressed in the exemplary embodiments of FIGS. 8 and 9, to a fastening element with a female thread. In this case, an annular carrier part 21, whose outer region is shown only schematically, and which can carry a male thread, detent means, a groove, or the like, can be inserted into a suitably drilled-open terminal portion of the threaded bore of a nut 6 and secured, for instance by screwing, detent locking, adhesive bonding or the like. The annular carrier part 21 includes spring tongues 22 that point radially inward and rearward and that in principle correspond to the spring tongues 5 of FIG. 8, whose inner regions in FIG. 10 however form the fragment of a female thread, because the radially inner ends of the circumferentially distributed spring tongues 22 are axially offset in such a way that in the preassembled state they are located on a helical line which represents a continuation of the screw course, not visible in FIG. 10, of the female thread of the nut 6. The nut, with the inserted annular carrier part 21 which may also protrude from the face end, can be selectively first thrust axially part way, with the carrier part leading, onto a fitting threaded bolt and then screwed on with its actual threaded part until it reaches the final assembly position. However, it can also be screwed on by a rotary motion from the very outset. Dismantling can be done nondestructively at any time. With such a carrier element, it is also possible for an elastic element as in FIGS. 3a, b and c to be mounted on the nut.

The reception region located on the nut for the carrier element may also be annular and on the outside of the ring may have a thread, detent means or the like for receiving a carrier part with a female thread or with detent means located on the inside.

I claim:

1. A fastening element comprising:
   a threaded part having a thread with a symmetry axis, a central axis along the symmetry axis of said thread, a front axial end, and a rear axial end;
   a portion forming a carrier part;
   a radially elastic element disposed at said portion, said radially elastic element having an extension part extending radially at least into a radial region of the thread of said threaded part, and
   being disposed forward of said front axial end of the thread of said threaded part;
   wherein a shape of said radially elastic element and said carrier part together relative to the central axis is non-cylindrical; and
   wherein said extension part is dimensioned to be movable by an axial pushing motion relative to a thread of a counterpart threaded part (a) along a path parallel to the central axis into a positive engagement with the counterpart threaded part, and (b) along at least one of a path parallel to the central axis and a path following the thread of the counterpart threaded part when untightening and separating a screwed connection between both threaded parts.

2. A fastening element as claimed in claim 1:
   wherein said threaded part and said carrier part are two discrete components;
   wherein said threaded part has male threads; and
   wherein a segment of a first one of said two discrete components is a tang-like protrusion formed integrally therewith and a segment of a second one of said two discrete components is a mating hollow space.

3. A fastening element as claimed in claim 1, wherein said threaded part and said carrier part include mating threads which connect said carrier part to said threaded part.

4. A fastening element as claimed in claim 1, wherein said threaded part and said carrier part include mating detent members which connect said carrier part to said threaded part.

5. A fastening element as claimed in claim 1, wherein said radially elastic element includes a spring tongue.

6. A fastening element as claimed in claim 1, wherein said radially elastic element is shaped to become detent locked to the thread of the counterpart threaded part.

7. A fastening element as claimed in claim 1:
   wherein said threaded part and said radially elastic element are separately manufactured components; and
   wherein said carrier part further includes a means for integrally joining said radially elastic element to said threaded part.

8. A fastening element as claimed in claim 1, wherein said threaded part, said carrier part and said elastic element, irrespective of any existing coating, together are formed as no more than two discrete components.

9. A fastening element comprising:
   a threaded part having a male thread with a symmetry axis, a central axis along the symmetry axis of said thread, a front axial end, and a rear axial end;
   a portion forming a carrier part;
   a radially elastic element disposed at said portion, said radially elastic element having an extension part extending radially at least into a radial region of the thread of said threaded part, and
   being disposed forward of said front axial end of the thread of said threaded part;
   wherein a shape of said radially elastic element and said carrier part together relative to the central axis is non-cylindrical;
   wherein said threaded part and said carrier part are together formed as at least two discrete components;
   wherein a segment of a first one of said two discrete components is a tang-like protrusion formed integrally therewith and a segment of a second one of said two discrete components is a mating hollow space; and
   whereby an axial pushing motion on said elastic element relative to a thread of a counterpart threaded part leads to a positive engagement of said radially elastic element with the counterpart threaded part after a radial compressing of said radially elastic element.

10. A fastening element as claimed in claim 9, wherein said threaded part and said carrier part include mating threads which connect said carrier part to said threaded part.

11. A fastening element as claimed in claim 9, wherein said threaded part and said carrier part include mating detent members which connect said carrier part to said threaded part.

12. A fastening element as claimed in claim 9, wherein said radially elastic element is shaped to become detent locked to the thread of the counterpart threaded part.

13. A fastening element as claimed in claim 9, wherein said radially elastic element is removable from the thread of the counterpart threaded part by a relative screwing action without damage to said elastic element.

14. A fastening element as claimed in claim 9, wherein said radially elastic element and said carrier part together have at least in part a significantly varying outside measure along said central axis.

15. A fastening element comprising:
   a threaded part having a thread with a symmetry axis, a central axis along the symmetry axis of said thread, a front axial end, and a rear axial end;
   a portion forming a carrier part;
   a radially elastic element disposed at said portion, said radially elastic element having an extension part extending radially at least into a radial region of the thread of said threaded part,
      being disposed forward of said front axial end of the thread of said threaded part, and
      being formed at least in part as a thread fragment, which is located on a thread course corresponding to the thread of said threaded part;
   whereby an axial pushing motion on said elastic element relative to a thread of a counterpart threaded part leads to a positive engagement of said radially elastic element with the counterpart threaded part after a radial movement of said radially elastic element.

16. A fastening element as claimed in claim 15, wherein said threaded part and said carrier part include mating detent members which connect said carrier part to said threaded part.

17. A fastening element as claimed in claim 15:
   wherein said radially elastic element is at least in part spring tongue shaped; and
   wherein a portion of said extension part of said radially elastic element is spring tongue segments, which are axially offset in such a way that said spring tongue segments are located on a thread course corresponding to the thread of said threaded part.

18. A fastening element as claimed in claim 15, wherein said radially elastic element is shaped to become detent locked to the thread of the counterpart threaded part.

* * * * *